United States Patent [19]

Pelletier et al.

[11] Patent Number: 5,028,380
[45] Date of Patent: Jul. 2, 1991

[54] METHOD AND DEVICE FOR THE IDENTIFICATION OF LEAKINESS IN A NEUTRON-CAPTURING PENCIL OF A NUCLEAR REACTOR

[75] Inventors: Jacques Pelletier, Meudon; Daniel Parrat, Echirolles, both of France

[73] Assignee: Electricite de France (Service National), Paris, France

[21] Appl. No.: 377,229

[22] Filed: Jul. 6, 1989

[30] Foreign Application Priority Data

Jul. 6, 1988 [FR] France .................. 88 09160

[51] Int. Cl.⁵ .................................. G21C 17/00
[52] U.S. Cl. .................................. 376/250
[58] Field of Search .................. 376/250, 251, 253

[56] References Cited

U.S. PATENT DOCUMENTS

| | | | |
|---|---|---|---|
| 3,042,598 | 7/1962 | Crowther | 376/419 |
| 4,033,813 | 7/1977 | Holt et al. | 376/250 |
| 4,072,559 | 2/1978 | Neidl et al. | 376/253 |
| 4,696,788 | 9/1987 | Seli | 376/253 |
| 4,741,878 | 5/1988 | Gebelin et al. | 376/245 |

FOREIGN PATENT DOCUMENTS

| | | |
|---|---|---|
| 213028 | 3/1987 | European Pat. Off. . |
| 1248822 | 8/1967 | Fed. Rep. of Germany . |
| 2700988 | 7/1977 | Fed. Rep. of Germany . |
| 2569041 | 2/1986 | France . |
| 62-6200 | 1/1987 | Japan .................. 376/250 |

Primary Examiner—Daniel D. Wasil
Attorney, Agent, or Firm—Blakely, Sokoloff, Taylor & Zafman

[57] ABSTRACT

Disclosed are a method and device for the identification of the leakiness of a neutron-capturing pencil, or control rod, of a nuclear reactor. The pencil is placed in an impervious chamber filled with an aggressive chemical solution. The solution is put under pressure in order to make it penetrate the defective pencil, then this pressure is relaxed in order to enable the solution to go out of the presumably defective pencil in the impervious chamber. The solution is analyzed in order to show up metallic salts of the constituent elements of the core of the pencil. Application is to routine checks on neutron-capturing pencils of a pressurized-water nuclear reactor.

10 Claims, 2 Drawing Sheets

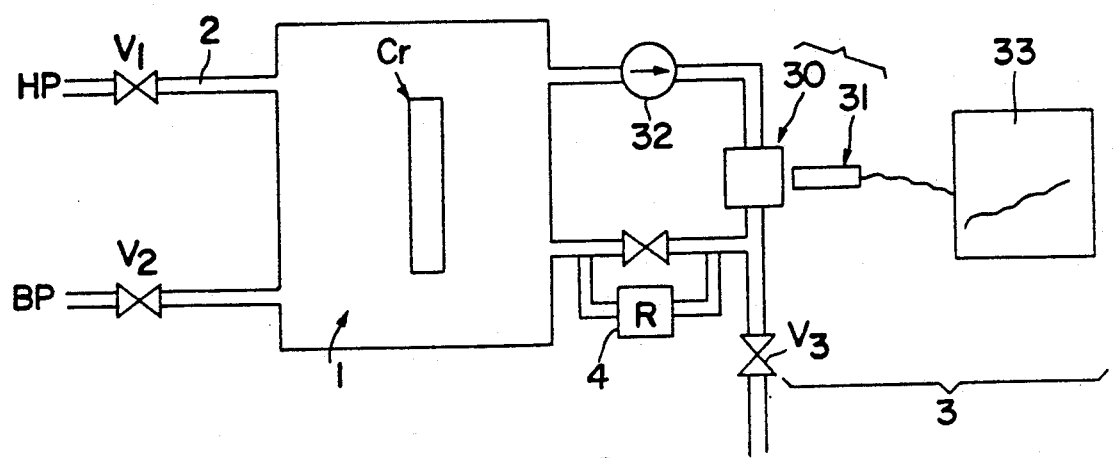
FIG_2
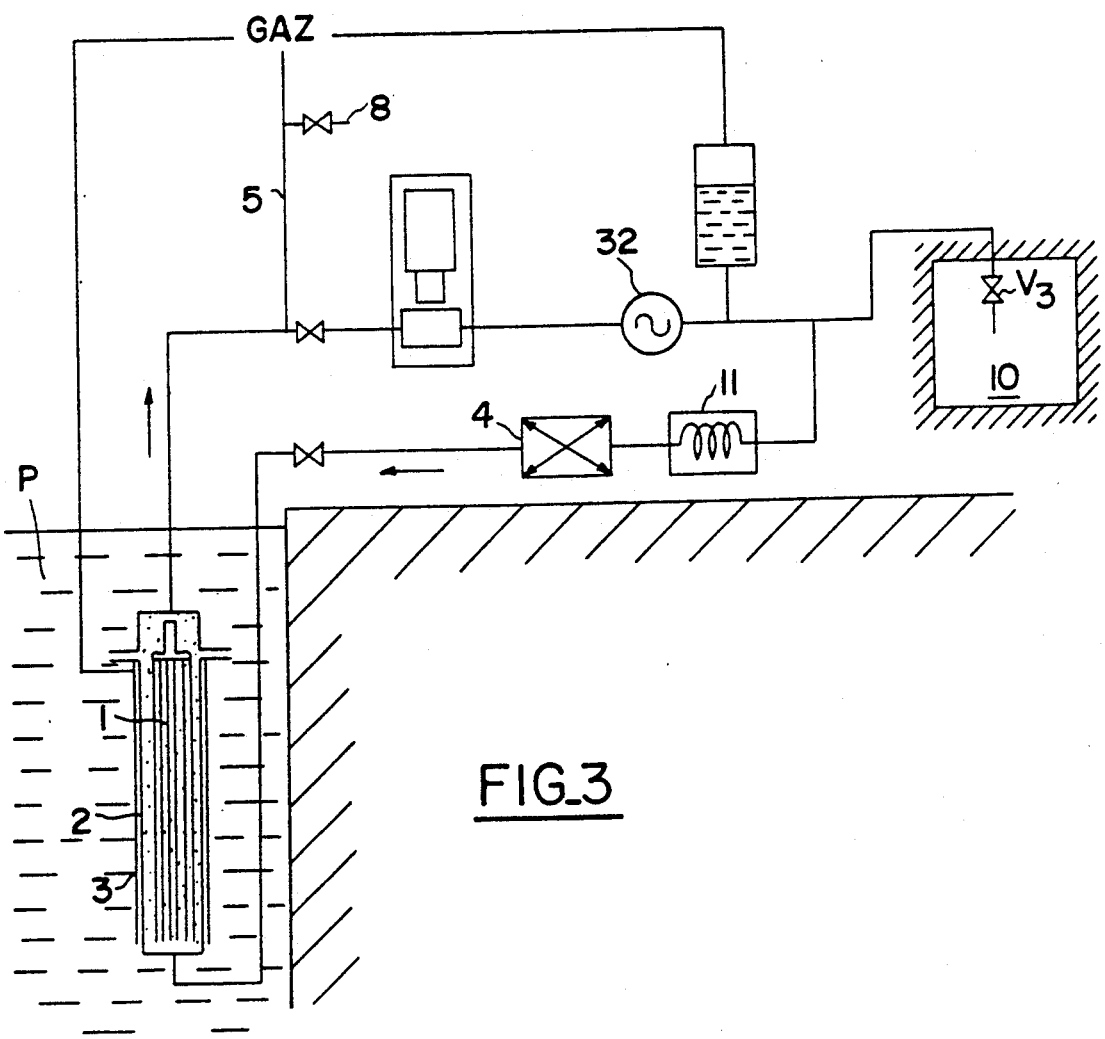
FIG_3

METHOD AND DEVICE FOR THE IDENTIFICATION OF LEAKINESS IN A NEUTRON-CAPTURING PENCIL OF A NUCLEAR REACTOR

BACKGROUND OF THE INVENTION

1. Field of the Invention

The present invention pertains to a method and device for the identification of leakiness flaws in a neutron capturing (or absorbing) pencil (or rod) of a nuclear reactor.

2. Description of the Prior Art

In pressurized-water nuclear reactors used in nuclear power plants for the production of electrical power, the core of the nuclear reactor is formed by an assembly of enriched uranium rods between which neutron-capturing pencils are inserted in order to control the activity of the reactor. As a rule, as shown in FIG. 1a, the pencils are formed by hollow tubes made of stainless steel, the inside of each tube being filled with a metallic alloy formed by 80% silver, 50% indium and 5% cadmium. The tubes, in the case of a 900 MW power reactor for example, have a length of the order of 3.60 m. and are assembled in a cluster by means of a spider-support formed by a metallic part enabling the neutron-capturing pencils to be fastened by one of their ends. Thus, as shown schematically in FIG. 1b, in order to check the activity of the nuclear reactor, the neutron-capturing pencils, set up in a cluster, are introduced into the passage tubes made in the core of the reactor. The degree of penetration of the neutron-capturing pencils determines the instantaneous power of the nuclear reactor. The total penetration of the pencils corresponds to the shutdown of the reactor. During the working of the reactor, depending on the electrical power called up by the electrical power distributing network, the neutron-capturing pencils forming the cluster are, on the contrary, moved out of the passage tubes along about three-quarters of their length. The core of the reactor and the neutron-capturing pencils are then subjected to a very great flow of pressurized water, of the order of 3000 m3/s, in order to heat this water in contact with the core of the reactor. Owing to the flow of fluid to which they are subjected, the neutron-absorbing pencils should be held by guiding plates on their unoccupied part which is not engaged in the guiding tubes. The many swirls of pressurized water subject the neutron-capturing pencils, notably at the guiding plates and guiding tubes, to repeated shocks which, in the long run, cause a phenomenon of local wearing out of the corresponding pencils with the risk of loss of imperviousness of the steel tube forming each neutron-capturing pencil. The silver contained in the tubes forming the neutron-capturing pencils may become radioactive by neutron capture, notably at the lower part of these neutron-capturing pencils where the flow of neutrons is never negligible, and the risks of loss of imperviousness of the steel tubes forming each neutron-capturing pencil entails major risks of contamination of the environment and of people during the handling of the clusters outside the core of the reactor.

Furthermore, the risk of total breakage of the neutron-capturing pencils at their lower part is not negligible, and there is then the risk that these lower parts will sink to the bottom of the guidance tube. The effect of this, owing to the risk of jamming, is to create an additional risk of preventing the shutdown of the nuclear reactor. Systematic studies have shown that a rate of total breakage of 50% of at least of a neutron-capturing pencil is reached after a lifetime of four to five years.

SUMMARY OF THE INVENTION

An object of the method and device for the identification of the leakiness of a neutron-capturing pencil according to the invention is enabling the identification of the untimely leakiness of the neutron-capturing pencils of a nuclear reactor.

A noteworthy feature of the method used to identify the leakiness of a neutron-capturing pencil of a nuclear reactor according to the invention is that the pencil is placed in an impervious chamber filled with an aggressive solution called an analyzing solution. The analyzing solution is put under pressure in order to make it penetrate the pencil through the leakiness of the presumably defective pencil, the pressure being then relaxed in order to enable the solution to come out of the presumably defective pencil. An analysis of the solution is then done in order to make it possible to show up, in the solution, chemical derivatives of the constituent elements of the core of the pencil. The device for identifying the leakiness of a neutron-capturing pencil of a nuclear reactor according to the invention is noteworthy in that it comprises an impervious chamber capable of receiving at least one neutron-capturing pencil to be analyzed. The impervious chamber is provided with a circuit for the supply of analyzing solutions and an analysis circuit connected to the impervious chamber, comprising an analyzing solution circulating pump, a radioactive particle counting vessel, radioactive particle counting means and a valve for taking samples of the analyzing solution.

The method and the device according to the invention can be applied to making checks on the imperviousness of neutron-capturing pencils of nuclear reactors pressurized-water nuclear power plants.

BRIEF DESCRIPTION OF THE DRAWINGS

The invention will be better understood from the following description and the drawings wherein, in addition to FIGS. 1a and 1b, respectively relating to a neutron-capturing pencil in current installations used in nuclear power plants:

FIG. 2 shows a drawing of an installation enabling the implementation of the method according to the invention;

FIG. 3 shows a drawing of a complete installation of a device for the identification of the leakiness of a neutron-capturing pencil in a nuclear station.

DESCRIPTION OF PREFERRED EMBODIMENTS

Figure 1A:
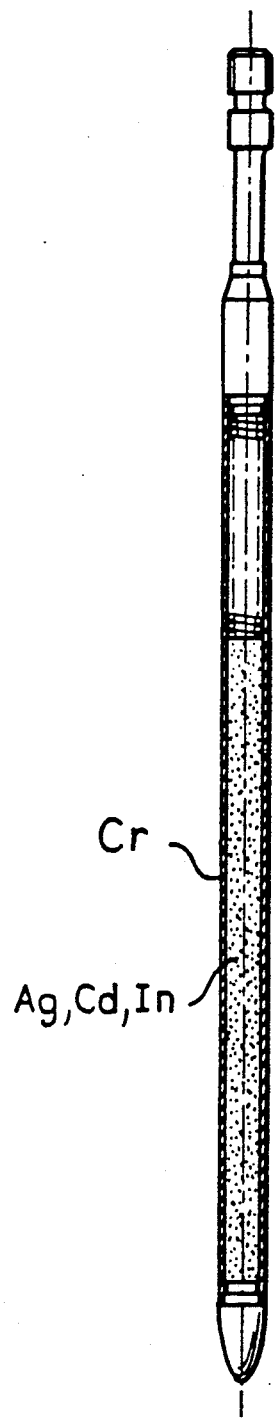
Figure 1B:
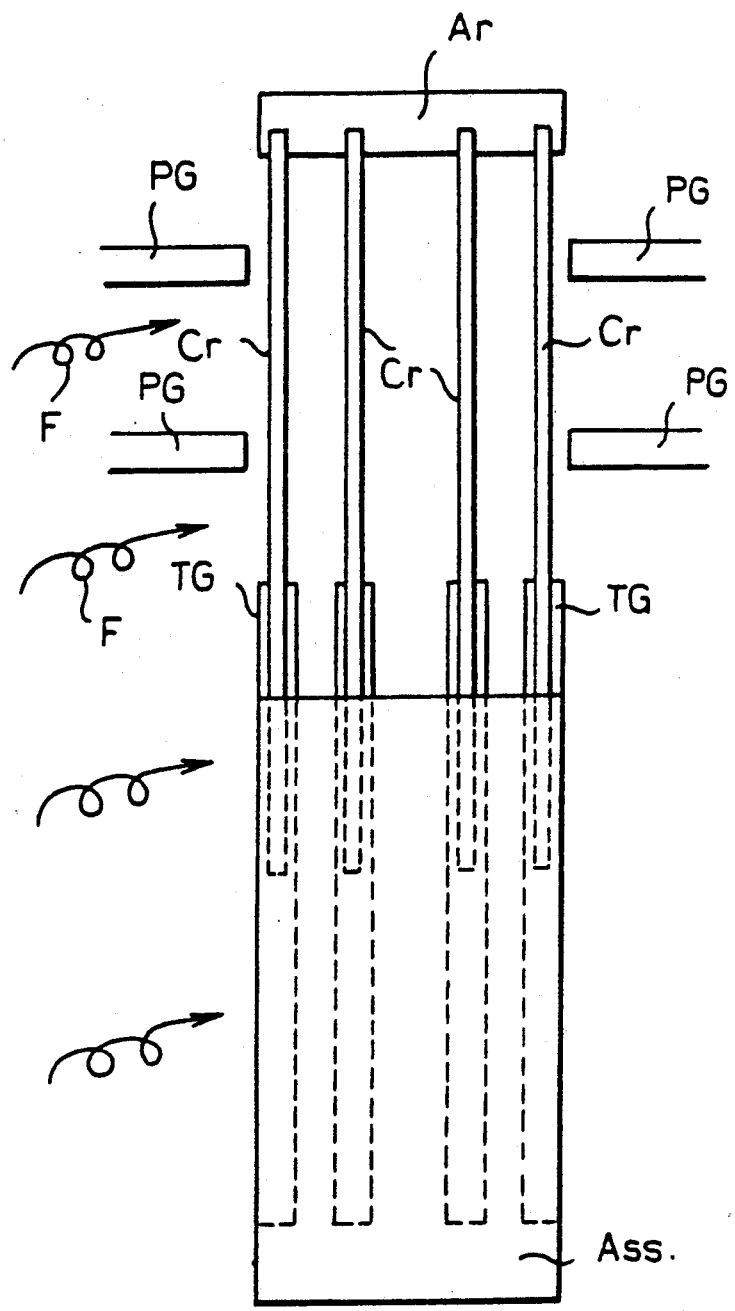

The method for the identification the leakiness of a neutron-capturing pencil of a nuclear reactor, according to the invention, shall be described firstly in relation to FIG. 2.

As shown schematically in the above-mentioned figure, the pencil, or control rod, marked Cr is placed in an impervious chamber marked 1. This chamber is filled with an aggressive solution called an analyzing solution. The aggressive solution may be formed by a solution of an acid taken from one of the following groups: nitric acid, sulphuric acid, hydrochloric acid. The concentration of this solution ranges between N/100 and $10^N$. As a non-exhaustive example, it may be N/30 where N designates the normality of the solution.

The above-mentioned analyzing solution is then put under pressure, marked HP, in order to make this solution penetrate the pencil Cr through the leakiness of this presumably defective pencil. The pressure is then relaxed and the solution is brought to a low pressure level (marked LP) so that the solution, which has penetrated the defective radius, can go out of it and return to the impervious chamber 1.

The solution is then analyzed in order to show up, in this solution, metallic salts of metals forming the core of the pencil.

For a pencil Cr, with a core formed by an alloy of cadmium Cd, indium In and silver Ag, the metallic salts are silver, indium and cadmium salts.

In addition to showing up nitrocompounds, the method according to the invention may advantageously consist in detecting, in the solution contained in the chamber 1 after the pressure is relaxed, a radioactive isotope of the alloy, more especially that of silver, marked Ag 110 m, with reference to a threshold value of concentration of this isotope.

Advantageously, the radioactive isotope of silver Ag 110 m is detected by gamma spectrometry.

In order to improve the detection of the above-mentioned radioactive isotope of silver Ag 110 m, prior to the step in which the pencil Cr is placed in the impervious chamber 1, filled with acid solution, this solution then forming the starting solution, the method according to the invention may also consist in determining, by spectrometry, the concentration in radioactive isotopes, including Ag 110 m, of the starting solution mentioned above. The concentration of the starting solution in radioactive isotopes, including Ag 110 m, is then chosen as the threshold value of concentration to measure the concentration in radioactive isotopes, notably silver.

The chemical concentration of silver in water may also be measured.

According to a particularly advantageous aspect of the method according to the invention, the pressure (HP) applied to the analyzing solution in order to make this solution penetrate the pencil Cr is maintained for a period of about 10 minutes at least. This pressure may advantageously be equal to several bars.

Furthermore, in order to accelerate the chemical reaction of the solution on the metals forming the core of the pencil Cr, the solution may be subjected, before or after the introduction of the pencil in the impervious chamber 1, to heating.

Furthermore, the method according to the invention may include a step consisting in the measurement of the chemical concentration of silver, indium and cadmium in the water before the pencil is placed in the chamber, said step being repeated after the pressurizing and heating operations.

A more detailed description of a device enabling the implementing of the method according to the invention shall be given with reference to FIG. 2.

According to the above-mentioned figure, the device includes the above-mentioned impervious chamber, marked 1, capable of receiving at least one pencil Cr to be analyzed. Of course, it will be understood that the device according to the invention can be advantageously implemented so that the impervious chamber 1 is capable of taking not one pencil Cr, but an entire cluster in order to make checks on it.

The impervious chamber 1 is provided with a circuit 2 for the supply of analyzing solution. The circuit for the supply of analyzing solution has a high pressure conduit provided with a valve V1 and a low pressure conduit provided with a valve V2. It will be understood, of course, that the actuation of the valves V1 and V2, with the HP conduit being connected, for example, to a compressor system, makes it possible, firstly, to pressure the analyzing solution in the impervious chamber 1 and to keep it under pressure by opening the valve V1, the valve V2 being closed or, on the contrary, by the closing of the valve V1 and the opening of the valve V2, the valve V2 being installed on the low pressure conduit, to bring the pressure down to a sufficiently low value, to enable the solution that has penetrated the pencil Cr, after chemical attack on the constituent elements of its core, to come out in the solution contained in the impervious chamber 1. The high pressure circuit HP may be connected, for example, to a compressor delivering pressure ranging from 1 to 15 bars. As a non-restrictive example, this pressure may be in the region of 12 bars. The low pressure circuit LP may, on the contrary, be connected to a circuit used to set up, in the impervious chamber 1, pressure close to that of the environment of this chamber or equal to a few bars.

As will be further seen in FIG. 2, the device according to the invention also has an analysis circuit 3 connected to the impervious chamber 1. This analysis circuit 3 has at least one circulation pump 32 for the analyzing solution and a counting vessel 30 for the counting of radioactive particles, including the silver isotope Ag 110 m. Means 31 for the counting of the radioactive particles are also planned, these means being associated with the counting vessel 30. Advantageously, the counting vessel 30 and the counting means 31 may be formed by a system, normally available in the market, for the counting of gamma rays. Of course, the counting vessel 30 and the counting means 31 are advantageously complemented by a display system 33 enabling the display of the result of the above-mentioned counting measurements.

Furthermore, the analysis circuit 3 also has a valve V3 for taking samples of the analyzing solution. With reference to FIG. 2, the sequence of operations enabling the application of the method is as follows:

According to a particularly advantageous mode, and prior to the pressurizing of the impervious chamber 1 and before the introduction of the pencils Cr to be tested in the impervious chamber 1, a sample of the analyzing solution is taken by means of the valve V3 in order to measure the residual content of the solution in metallic salts, notably, silver salts. In the same way, a count is done, using the means 31 for the counting of radioactive particles in this starting solution, in order to determine the threshold value corresponding to the presence of the radioactive isotopes, including the above-mentioned Ag 110 m. After the pencil Cr to be tested is introduced into the impervious chamber 1, the opening of the valve V1 enables the pressurizing of the chamber, and this pressurizing is done at a value ranging from 1 to 15 bars.

This pressure is maintained for at least ten minutes, then the valve V1 is again closed and the valve V2 is opened, thus enabling a depressurization to be done.

The display means 33 can be used to follow the development of the on-line count signal delivered by the counting means 31.

A sampling of the analyzing solution through the valve V3 then makes it possible to make an evaluation of the material in the fluid and a quantitative analysis of the silver, indium or cadmium ions or their radioactive isotopes therein.

The comparison of the values measured, in nitrocompounds, of the constituent elements of the core of the pencil with their value in the starting solution, taken as a threshold value, then makes it possible to identify the pencil Cr or the leaky cluster.

As is further shown in FIG. 2, the analysis circuit 3 also has, connected as a bypass to this analysis circuit, a circuit 4 to heat the solution. Advantageously, the solution heating circuit 4 may be formed by any circuit for the electrical heating of a thermostat controlled chamber used to carry the analyzing solution, put into circulation by the circulation pump 32, to a temperature ranging from 30° to 90° C. As a non-restrictive example, this temperature may be 75° C.

FIG. 3 shows the diagram of a complete installation of a device according to the invention. Of course, the pencil or pencils and the corresponding cluster have a non-negligible degree of radioactivity, and the manipulation of the latter can be contemplated only in immersion in the water of the pool of the corresponding nuclear reactor. To this end, and although the tools used to manipulate the pencil or pencils and the cluster have not been shown in FIG. 3, the device according to the invention, and especially the impervious chamber 1, is immersed in the pool P of the nuclear reactor. Of course, the set of circuits formed by the high pressure circuit HP, the low pressure circuit LP, the impervious chamber 1 and the analysis circuit 3 is impervious to the water of the pool.

FIG. 3 also shows the valve V3 in a chamber shielded against ionizing radiation, it being possible to perform the analysis of chemical derivatives of the constituent elements of the core of each pencil in the above-mentioned chamber.

We have thus described a method and device enabling the detection or identification the leakiness of one or more neutron-capturing pencils of a nuclear reactor.

The method and device according to the invention are particularly advantageous inasmuch as they enable systematic checking of parts essential to the working of a pressurized-water nuclear reactor, namely essential parts such as neutron-capturing pencils and the corresponding clusters for the checking of the working of the reactor.

What is claimed is:

1. A method for the identification of the leakiness of a neutron-absorbing pencil of a nuclear reactor, said pencil having a hollow tube and a core formed by at least one metal, said method comprising the steps of:
    placing said pencil in an impervious chamber filled with a chemical solution capable of reacting with said metal;
    putting said solution under pressure in order to make the solution penetrate the pencil through the leakiness fault of the presumably defective pencil;
    then lowering said pressure to enable the solution to go out of the presumably defective pencil in the impervious chamber;
    performing an analysis of said solution in order to enable the showing up, in the solution, of chemical derivatives of said metals of the core of said pencil.

2. A method according to claim 1, wherein the aggressive chemical solution is a solution of an acid taken from the following group: nitric acid, sulphuric acid, hydrochloric acid.

3. A method according to claim 1 wherein, for a pencil with its core formed by an alloy of cadmium, indium and silver, said chemical derivatives are the metallic salts of the constituent elements of the alloy.

4. A method according to claim 1 wherein, in addition to the showing up of said chemical derivatives, the method consists in performing, at the solution, after lowering the pressure, the detection of the radioactive isotopes of an alloy, notably silver Ag 110 m, with reference to a threshold value of concentration.

5. A method according to claim 4, wherein the detection of the radioactive isotopes of the alloy, notably of silver Ag 110 m is done by gamma spectrometry.

6. A method according to claim 5 wherein, prior to the step in which said pencil is placed in the impervious chamber filled with said chemical solution, which forms the starting solution, said method consists in the determining, by spectrometry, of the concentrations in radioactive isotopes, including Ag 110 m, of the starting solution, said concentrations of the starting solution being chosen as a threshold value of concentration.

7. A method according to claim 1, wherein said pressure applied to the solution in order to make the solution penetrate the pencil is maintained for a period of at least ten minutes.

8. A method according to claim 7, further comprising:
    a step consisting in the measurement of the chemical concentration of silver, indium, cadmium in the solution before the pencil is placed in the chamber;
    the repeating of this measuring step after the pressurizing operation.

9. A method according to claim 1, wherein said solution, before or after the insertion of said pencil in it, is subjected to a heating process used to accelerate a chemical reaction of the solution on the constituent elements of the core of said pencil.

10. A method according to claim 9, further comprising the steps of:
    measuring the chemical concentration of silver, indium, cadmium in the solution before the pencil is placed in the chamber; and
    repeating the measuring step after the heating process.

* * * * *